Figure 1:
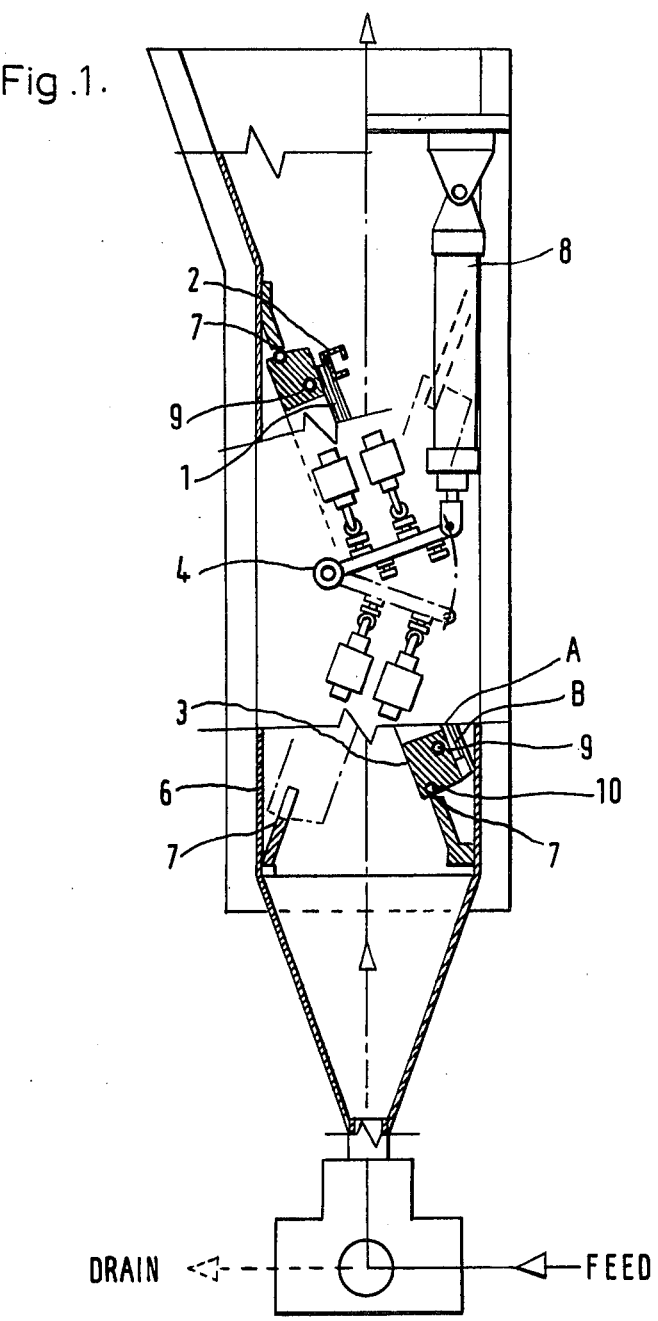

United States Patent [19]

Clough

[11] 4,199,446
[45] Apr. 22, 1980

[54] OIL/WATER SEPARATION PROCESS AND APPARATUS

[75] Inventor: George F. G. Clough, Macclesfield, England

[73] Assignee: Imperial Chemical Industries Limited, London, England

[21] Appl. No.: 929,781

[22] Filed: Jul. 31, 1978

[30] Foreign Application Priority Data

Aug. 15, 1977 [GB] United Kingdom ............... 34157/77

[51] Int. Cl.² ........................ B01D 17/04; B01D 29/02
[52] U.S. Cl. ..................................... 210/23 R; 210/76; 210/82; 210/391; 210/420; 210/DIG. 5
[58] Field of Search ................. 210/23 R, 76, 82, 108, 210/240, 417, 420, 423, 424, DIG. 5, 391, 359

[56] References Cited

U.S. PATENT DOCUMENTS

| | | | |
|---|---|---|---|
| 1,947,709 | 2/1934 | Garrison et al. | 210/23 R |
| 2,522,378 | 9/1950 | Kirkbride | 210/DIG. 5 |

FOREIGN PATENT DOCUMENTS

| | | |
|---|---|---|
| 900737 | 7/1962 | United Kingdom . |
| 993849 | 6/1965 | United Kingdom . |
| 1359199 | 7/1974 | United Kingdom . |
| 1445449 | 8/1976 | United Kingdom . |
| 1445692 | 8/1976 | United Kingdom . |
| 1472553 | 5/1977 | United Kingdom . |

Primary Examiner—John Adee
Attorney, Agent, or Firm—Cushman, Darby & Cushman

[57] ABSTRACT

A process and apparatus for the removal of oil from an oil in water emulsion, the apparatus comprising a vessel, means for passing the emulsion in an upward direction through the vessel and means for draining the vessel, a coalescer located in the vessel, the coalescer having a first face and a second face, means for moving the coalescer from a first position in which its first face is on the underside of the coalescer to a second position in which the second face is on the underside of the coalescer and vice versa, outlet means for the treated emulsion and means for removing coalesced oil droplets from the treated emulsion.

12 Claims, 2 Drawing Figures

DRAIN ← ← FEED

OIL/WATER SEPARATION PROCESS AND APPARATUS

The present invention concerns the removal of oil from an oil in water emulsion by a process in which the oil in water emulsion is passed through a coalescer which coalesces the oil droplets within the emulsion so that they can be removed by gravity separation.

A drawback of the currently available processes for the removal of oil from an oil in water emulsion by passage of the emulsion through a fibrous or similar coalescer is that if, as is usual, the emulsion contains a high proportion of suspended solids, the passageways through the coalescer become progressively obstructed by solids. Apart from reducing the efficiency of the coalescer, which ultimately requires to be replaced, the presence of solids in the passageways through the coalescer causes a build-up of hydrostatic pressure differential across the coalescer. In practice the hydrostatic pressure differential can reach as high as 30 to 50 pounds per square inch which necessitates the housing of the coalescer within an expensive pressure vessel.

According to the present invention we provide a process for the removal of oil from an oil in water emulsion which comprises carrying out, in sequence, the following operations: (1) passing the oil in water emulsion into and through a vessel containing a rectangular shaped oil coalescer which is immersed in the emulsion so that the emulsion flows through the coalescer from a first face to a second face, (2) removing coalesced oil droplets formed downstream of the coalescer, (3) temporarily reversing the direction which the emulsion flows through the coalescer, (4) changing the position of the coalescer within the vessel so that, when subsequently the emulsion re-enters the vessel, the emulsion flows through the coalescer from its second face to its first face, (5) causing the emulsion to re-enter, fill and pass through the vessel, (6) removing the coalesced oil droplets formed downstream of the coalescer, (7) temporarily reversing the direction which the emulsion flows through the coalescer, (8) changing the position of the coalescer within the vessel so that, when subsequently the emulsion re-enters the vessel, the emulsion flows through the coalescer from its first face to its second face, (9) causing the emulsion to re-enter, fill and pass through the vessel, and (10) repeating, in sequence, the operations.

During operations (1) and (5) of the process of the invention, suspended solids are retained on the upstream face of the coalescer and the passageways through the coalescer are progressively obstructed by the solids. However during operations (3) and (7), the temporary reversal of the flow through the coalescer causes a substantial proportion of the retained solids to be dislodged and removed in the stream. Most of the solids still remaining on what is then the downstream face of the coalescer are removed during operations (5) and (9).

Conveniently the process of the invention is carried out in an upright vessel having a rectangular cross section so that in operations (1) and (5) the emulsion stream passes upwards through the vessel and in operations (3) and (7) downwards through the vessel, the latter operations being achieved merely by draining the vessel.

We also prefer the operations (3) and (7) are performed when the hydrostatic pressure differential across the coalescer has reached a certain selected value. We have found in practice that satisfactory results are obtained when the hydrostatic pressure differential across the coalescer has reached a pressure in the range 3 to 10 pounds per square inch, a preferred pressure being 5 pounds per square inch.

When the pressure differential across the coalescer never exceeds a pressure of the order of 5 pounds per square inch, the solids within the emulsion are only loosely retained on the upstream face of the coalescer rather than being forced into, and becoming embedded in, the coalescer.

Furthermore, and equally important, because of the low pressures involved the process of the invention can be carried out in an inexpensive vessel constructed from, for example, a plastics material.

Alternatively operations (3) and (7) may be performed on a selected time scale basis.

In a preferred process in operations (3) and (7) the coalescer is re-positioned in the vessel pneumatically.

In operations (2) and (6) of the process of the invention the larger oil droplets which are formed can be separated from the treated liquid by allowing the droplets to float to the surface or sink to the bottom of a collection vessel to form a layer of oil which can be removed.

It is to be understood that the term "oil" insofar as the present invention is concerned includes a liquid which is not completely miscible with water or the aqueous phase forming the emulsion.

According to another feature of the invention we provide an apparatus for the removal of oil from an oil in water emulsion which comprises a vessel, means for passing the emulsion in an upward direction through the vessel and means for draining the vessel, a coalescer located in the vessel, the coalescer having a first face and a second face, means for moving the coalescer from a first position in which its first face is on the underside of the coalescer to a second position in which the second face is on the underside of the coalescer and vice versa, outlet means for the treated emulsion and means for removing coalesced oil droplets from the treated emulsion.

In a preferred apparatus, the vessel, at least in the region of the coalescer, has a substantially rectangular, and more desirably substantially square, cross section. It will thus be appreciated that we prefer that the coalescer is a substantially rectangular, and more desirably substantially square, plate.

Conveniently the apparatus is provided with a pump for passing the emulsion into and through the vessel.

Conveniently the apparatus is provided with a drain outlet which communicates with the inlet to the vessel, flow through the drain outlet or inlet to the vessel being governed by a suitable cock. The outlet means for the treated emulsion may comprise an overflow weir or a conduit connecting with an oil/water separation device for example a gravity separator with or without parallel plates. The coalescer used may have a fibrous structure based on fibres of such diverse materials as alumina, alumina/silica, zirconia, glass, borosilicate glass, calcium or aluminium silicate, vitreous aluminosilicate, natural fibres such as cotton or rayon, synthetic fibres such as fibres of a polyolefine or a polyester.

Particularly desirable fibrous structures are described in United Kingdom Pat. No. 1,488,682. Other desirable fibrous structures based on fibres of alumina or zirconia are described in United Kingdom Pat. No. 1,488,683.

Alternatively the coalescer used may have an open-cell foam structure, for example as described in our copending patent application No. 10856/77.

Figure 2:
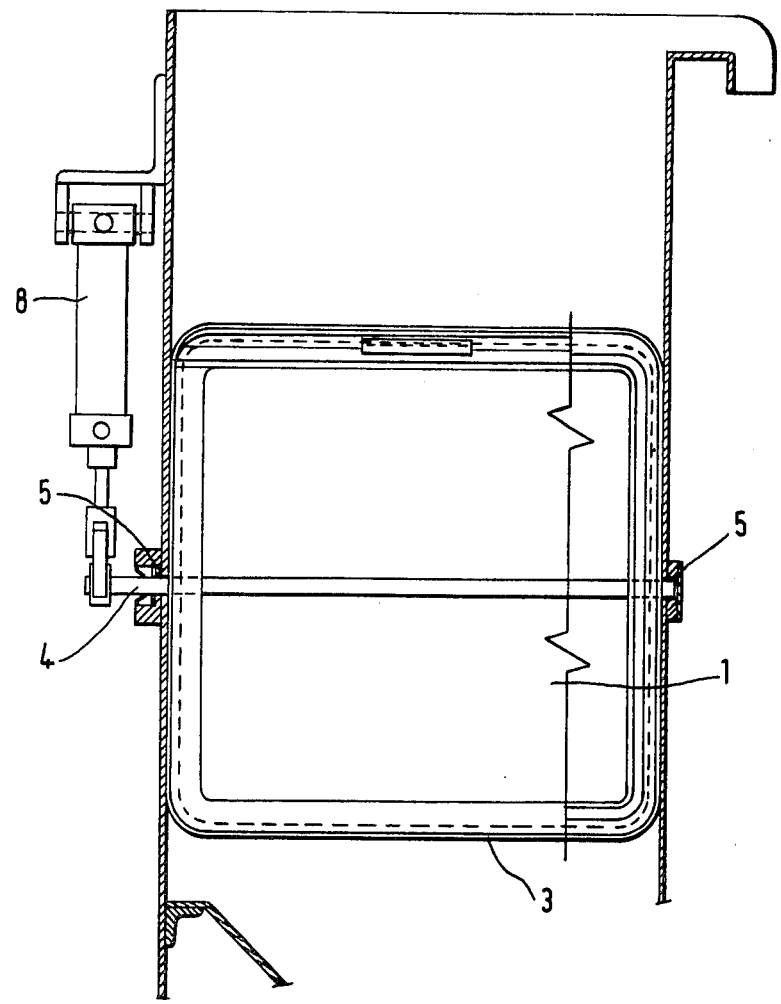

The invention will now be described with reference to the accompanying drawings in which:

FIG. 1 shows a view in vertical section of an apparatus according to the invention, and FIG. 2 shows a view, in part side elevation, of FIG. 1.

In the apparatus shown, a substantially square plate 1 of a coalescing material is held in a sealed manner in a carrier 2 which in turn is held in a sealed manner in a frame 3 carried by a horizontal shaft 4 carried in trunnions 5. The carrier is held in the frame by an inflatable seal 9. When the seal is deflated and with the frame in the position shown in FIG. 1, the carrier, with the coalescing plate, may be removed from the frame. Hereinafter we refer collectively to the above referenced items as 'the assembly'. The assembly can be moved into one or two positions in a vessel 6. The positions are determined by the location of the assembly against either of two sealing faces 7. When the assembly is located in either of these positions the oil/water emulsion entering at the bottom of the casing in the direction arrowed, of necessity, passes through the coalescing material. After passing through the coalescing material the treated liquid passes out of the casing at the top in the direction arrowed. The object of changing the position of the assembly is to ensure that the oil/water emulsion flows in one direction through the coalescing plate when the asembly is in one position and in the opposite direction through the coalescing plate when the assembly is in the other position.

The movement from one position to the other position is achieved by the operation of an air cylinder 8 under the control of pneumatic elements (not shown).

The operating cycle is as follows:

(1) Oil/water emulsion passes through the coalescing material in one direction i.e. from face A to face B. As the emulsion passes through the coalescing plate, coalescence of the oil droplets occurs so that, after leaving face B, the oil is in a condition which allows it to be removed by gravity separation.

In practice the oil/water emulsion contains suspended solids which in due course become lodged on face A of the coalescing plate thereby hindering the flow through the coalescing plate. After a certain period of time the pressure drop across the coalescing plate becomes very high and it is undersirable to proceed.

(2) At this point in time the flow of emulsion through the vessel is stopped temporarily and a drain connection at the lower end of the vessel opened so that the contents of the vessel above the coalescing plate pass through the plate in the reverse direction. Most of the solids lodged on face A are dislodged and drain away with the liquid.

(3) When the liquid reaches a selected low level in the vessel, the position of the assembly is changed. This involves the following steps:
   (a) Release of pressure in the inflatable seal 10.
   (b) Changing the position of the assembly.
   (c) Reinflation of the seal 10 so that a watertight seal is again established against the sealing faces 7.

(4) The drain connection is closed and the oil/water emulsion re-admitted into the vessel and it once again flows through the coalescing material but this time from face B to face A. Any solids still remaining on face A are washed through with the stream.

(5) The sequence of operations (1) to (3) (but with flow through the coalescing plate in the reverse direction) is repeated.

The above sequence of operations is repeated until the reversal of flow through the coalescer fails to dislodge a sufficiently great proportion of the solids lodged in the coalescer so that the process is ineffective. This requires the coalescer to be removed, after deflation of the inflatable seal, and to be replaced with a new coalescer.

I claim:

1. A process for the removal of oil from an oil in water emulsion which comprises carrying out, in sequence, the following operations: (1) passing the oil in water emulsion into and through a vessel containing a rectangular shaped oil coalescer which is immersed in the emulsion so that the emulsion flows through the coalescer from a first fact to a second face, (2) removing coalesced oil droplets formed downstream of the coalescer, (3) temporarily reversing the direction which the emulsion flows through the coalescer, (4) changing the position of the coalescer within the vessel so that, when subsequently the emulsion re-enters the vessel, the emulsion flows through the coalescer from its second face to its first face, (5) causing the emulsion to re-enter, fill and pass through the vessel, (6) removing the coalesced oil droplets formed downstream of the coalescer, (7) temporarily reversing the direction which the emulsion flows through the coalescer, (8) changing the position of the coalescer within the vessel so that, when subsequently the emulsion re-enters the vessel, the emulsion flows through the coalescer from its first face to its second face, (9) causing the emulsion to re-enter, fill and pass through the vessel, and (10) repeating, in sequence, the operations.

2. A process as claimed in claim 1 in which operations (3) and (7) are performed when the hydrostatic pressure differential across the coalescer has reached a selected value.

3. A process as claimed in claim 1 in which the selected hydrostatic pressure differential is in the range 3 to 10 pounds per square inch.

4. A process as claimed in claim 1 in which operations (3) and (7) are performed on a selected time scale basis.

5. A process as claimed in claim 1 in which in operations (3) and (7) the coalescer is re-positioned pneumatically.

6. An apparatus for the removal of oil from an oil in water emulsion which comprises a vessel, means for passing the emulsion in an upward direction through the vessel and means for draining the vessel, a coalescer located in the vessel, the coalescer having a first face and a second face, means for moving the coalescer from a first position in which its first face is on the underside of the coalescer to a second position in which the second face is on the underside of the coalescer and vice versa, outlet means for the treated emulsion and means for removing coalescer oil droplets from the treated emulsion, wherein said moving means comprises a member in operative connection with said vessel and said coalescer for moving said coalescer from said first position to said second position and vice versa.

7. An apparatus as claimed in claim 6 in which the vessel, in the region of the coalescer, and the coalescer have a substantially rectangular cross section.

8. An apparatus as claimed in claim 6 provided with a pump for passing the emulsion into and through the vessel.

9. An apparatus as claimed in claim 6 provided with a drain outlet which communicates with the inlet to the vessel, flow through the drain outlet or inlet to the vessel being governed by a cook.

10. An apparatus as claimed in claim 6, wherein said moving means is a pneumatic means.

11. An apparatus as claimed in claim 10, wherein said moving member comprises an air cylinder.

12. An apparatus as claimed in claim 6, wherein said coalescer is pivotably attached to said vessel.

* * * * *